United States Patent
Fukuchi et al.

[11] Patent Number: 5,945,482
[45] Date of Patent: *Aug. 31, 1999

[54] RESIN COMPOSITION FOR WATER-REPELLENT COATING AND WATER-REPELLENT COATING

[75] Inventors: Yoshihisa Fukuchi; Miki Shikano, both of Tokyo, Japan

[73] Assignee: Toyo Ink Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/646,632

[22] Filed: May 8, 1996

[51] Int. Cl.$^6$ .......................... C08L 57/08; C09D 127/12
[52] U.S. Cl. .......................... 525/100; 525/101; 525/192; 525/199; 525/200
[58] Field of Search ...................................... 525/100, 101, 525/192, 199, 200

[56] References Cited

U.S. PATENT DOCUMENTS

| | | | |
|---|---|---|---|
| 5,100,962 | 3/1992 | Sawada et al. | 525/125 |
| 5,118,576 | 6/1992 | Aharoni et al. | 428/422 |

FOREIGN PATENT DOCUMENTS

| | | |
|---|---|---|
| 0 348 946 | 1/1990 | European Pat. Off. . |
| 0025416 | 2/1980 | Japan . |
| 1 303 806 | 1/1973 | United Kingdom . |

OTHER PUBLICATIONS

Saito et al., Patent Abstracts of Japan, vol. 18, No. 686 (C–1292), abstracting JP 6271733, 1994.
Saito et al., Patent Abstracts of Japan, vol. 018, No. 686 (C–1292) Dec. 26, 1994 JP–A–06 271733.

*Primary Examiner*—Jeffrey C. Mullis

[57] ABSTRACT

A resin composition for a water-repellent coating which is excellent in adhesion to a substrate and weathering resistance and has a high hardness equivalent to that of a hard coating and excellent acid resistance, which can exhibit these properties in spite of a low fluorine content, the composition containing a polymer (A) formed from 20 to 80% by weight of a fluorine-containing monomer (a) having a carbon-carbon unsaturated double bond and a perfluoroalkyl group, 20 to 80% by weight of a monomer (b) having a carbon-carbon unsaturated double bond and a crosslinkable functional group and 0 to 30% by weight of a monomer (c) having a carbon-carbon unsaturated double bond other than the monomers (a) and (b), and a polymer (B) formed from 20 to 100% by weight of a monomer (b) having a carbon-carbon unsaturated double bond and a crosslinkable functional group and 0 to 80% by weight of a monomer (c) having a carbon-carbon unsaturated double bond other than the monomer (a) and (b), and a water-repellent coating composition which is a solution of the above resin composition in a solvent.

11 Claims, No Drawings

RESIN COMPOSITION FOR WATER-REPELLENT COATING AND WATER-REPELLENT COATING

FIELD OF THE INVENTION

The present invention relates to a resin composition for a water-repellent coating and a water-repellent coating. More specifically, it relates to a resin composition for forming a water-repellent coating excellent in coherence to a substrate, weathering resistance and acid resistance, and a water-repellent coating composition.

PRIOR ART OF THE INVENTION

When water adhering to an article is inconvenient, the article is provided with a water-repellent coating for preventing the adherence of water. For example, a water-repellent coating called "liquid wiper" is well known. For securing a view, the liquid wiper is used on a windshield, side windows and wing mirrors of an automobile to repel water without wipers in rainy days. Since, however, a water-repellent coating formed from the liquid wiper is poor in durability, it is required to form the coating almost periodically for maintaining water repellency. The liquid wiper is also poor in acid resistance. Acid rain is a serious problem at present, and for example, materials for automobiles are required to have resistance to acid rain. Various fluorine-containing compounds have been and are therefore proposed for overcoming the problem caused by acid rain. For attaining sufficient water repellency, it is required to increase the fluorine content in the compound, while there is a problem in that the price of the compound increases since fluorine is expensive.

SUMMARY OF THE INVENTION

It is an object of the present invention to provide a resin composition for a water-repellent coating, which gives a water-repellent coating which is excellent in adhesion to a substrate and weathering resistance and has a high hardness equivalent to that of a hard coating and excellent acid resistance, and a water-repellent coating composition.

It is another object of the present invention to provide a resin composition for a water-repellent coating which can exhibit the above properties in spite of a low fluorine content, and a water-repellent coating composition.

It is further another object of the present invention to provide a resin composition for a water-repellent coating, which is inexpensive but can exhibit the above properties, and a water-repellent coating composition.

According to the present invention, there is provided a resin composition for a water-repellent coating, which contains a polymer (A) formed from 20 to 80% by weight of a fluorine-containing monomer (a) having a carbon-carbon unsaturated double bond and a perfluoroalkyl group, 20 to 80% by weight of a monomer (b) having a carbon-carbon unsaturated double bond and a crosslinkable functional group and 0 to 30% by weight of a monomer (c) having a carbon-carbon unsaturated double bond other than the monomers (a) and (b), and a polymer (B) formed from 20 to 100% by weight of a monomer (b) having a carbon-carbon unsaturated double bond and a crosslinkable functional group and 0 to 80% by weight of a monomer (c) having a carbon-carbon unsaturated double bond other than the monomer (a) and (b).

According to the present invention, further, there is provided a water-repellent coating composition which is a solution of the above resin composition in a solvent.

DETAILED DESCRIPTION OF THE INVENTION

The present inventors have succeeded in forming a coating which has a small fluorine content but has high water repellency and high toughness, from a composition prepared by mixing a polymer having a crosslinkable functional group with a polymer having a crosslinkable functional group and a perfluoroalkyl group, on the basis of a local presence of a fluorine-containing polymer on the coating surface.

That is, the present invention is directed to a resin composition for a water-repellent coating, which contains a polymer (A) formed mainly from a fluorine-containing monomer (a) having a carbon-carbon unsaturated double bond and a perfluoroalkyl group and a monomer (b) having a carbon-carbon unsaturated double bond and a crosslinkable functional group and either a polymer (B) formed from a monomer (b) having a carbon-carbon unsaturated double bond or a polymer (B) formed from a monomer (b) having a carbon-carbon unsaturated double bond and a crosslinkable functional group and a monomer (c) having a carbon-carbon unsaturated double bond other than the monomers (a) and (b).

The monomer (a) having a carbon-carbon unsaturated double bond and a perfluoroalkyl group, used in the present invention, includes perfluoroalkylalkyl (meth)acrylates having 1 to 20 carbon atoms and a perfluoroalkyl group such as 2-perfluoroisononylethyl (meth)acrylate, 2-perfluorononylethyl (meth)acrylate, 2-perfluorodecylethyl (meth)acrylate, 2-perfluorobutylethyl (meth)acrylate, perfluoromethylmethyl (meth)acrylate, perfluoroethylmethyl (meth)acrylate, perfluorobutylmethyl (meth)acrylate, perfluorooctylmethyl (meth)acrylate, perfluorodecylmethyl (meth)acrylate, perfluorobutylethyl (meth)acrylate, perfluorooctylethyl (meth)acrylate, perfluorodecylethyl (meth)acrylate, perfluoropropylpropyl (meth)acrylate, perfluorooctylpropyl (meth)acrylate, perfluorooctylamyl (meth)acrylate and perfluorooctylundecyl (meth)acrylate; and perfluoroalkyl alkylenes such as perfluorobutyl ethylene, perfluorohexyl ethylene, perfluorooctyl ethylene and perfluorodecyl ethylene. The above monomers may be used alone or in combination as amonomer (a) for the polymer (A) depending upon required properties. The amount of the monomer (a) is 20 to 80% by weight. For obtaining sufficient water repellency, the amount of the monomer (a) is preferably at least 40% by weight. For dissolving the monomer (a) in a halogen-free solvent for solution polymerization, the amount of the monomer (a) is preferably 60% by weight or less.

The monomer (b) having a carbon-carbon unsaturated double bond and a crosslinkable functional group is used for forming a hard coating by the crosslinkage after the application of the resin composition.

The crosslinkable functional group includes a hydrolyzable silyl group, a carboxyl group, an isocyano group, an epoxy group, an N-methylol or N-alkoxymethyl group and a hydroxy group. In particular, the hydrolyzable silyl group serves to form a hard coating.

Examples of the monomer (b) having a carbon-carbon unsaturated double bond and a hydrolyzable sily group include (meth)acryloxyalkylalkoxysilanes such as γ-(meth)acryloxypropyltirmethoxysilane and (meth)acryloxyalkylalkoxyalkylsilanes such as γ-(meth)acryloxypropylmethyldimethoxysilane, γ-(meth)acryloxypropyldiethoxysilane, timethoxyvilylsilane, dimethoxyethylsilane, triethoxyvinylsilane, triethoxyallylsilane, vinylmethyldimethoxysilane, vinylmethyldiethoxysilane and vinyltris(2-methoxyethoxy)silane.

Examples of the monomer (b) having a carbon-carbon unsaturated double bond and a carboxyl group include acrylic acid, methacrylic acid, crotonic acid, maleic acid and styrenesulfonoic acid.

Examples of the monomer (b) having a carbon-carbon unsaturated double bond and an isocyano group include (meth)acryloyloxyethyl isocyanate, (meth)acryloyloxypropyl isocyanate, and other compounds obtained by hydroxy (meth)acrylate such as 2-hydroxyethyl (meth)acrylate or 4-hydroxybutyl (meth)acrylate with polyisocyanate such as toluene diisocyanate, isophorone diisocyanate or Colonate L.

Examples of the monomer (b) having a carbon-carbon unsaturated double bond and an epoxy group include glycidyl methacrylate, glycidyl cinnamate, glycidyl allyl ether, glycidyl vinyl ether, vinylcyclohexane monoepoxide and 1,3-butadiene monoepoxide.

Examples of the monomer (b) having a carbon-carbon unsaturated double bond and an N-methylol or N-alkoxymethyl group include (meth)acrylamides having an N-monoalkoxymethyl group such as N-methylol (meth)acrylamide, N-methoxymethyl (meth)acrylamide, N-ethoxymethyl (meth)acrylamide, N-propoxymethyl (meth)acrylamide and N-butoxymethyl (meth)acrylamide, and (meth)acrylamides having an N,N-dialkoxymethyl group such as N, N-dimethylol (meth) acrylamide, N,N-di (methoxymethyl) (meth)acrylamide, N,N-di(ethoxymethyl) (meth)acrylamide, N,N-di(propoxymethyl) (meth) acrylamide and N,N-di(butoxymethyl) (meth)acrylamide.

Examples of the monomer (b) having a carbon-carbon unsaturated double bond and a hydroxy group include 2-hydroxyethyl (meth)acrylate, 1-hydroxypropyl (meth) acrylate, 2-hydroxypropyl (meth)acrylate, 4-hydroxybutyl (meth)acrylate, polyethylene glycol mono(meth)acrylate, polypropylene glycol mono(meth)acrylate, polytetramethylene glycol mono(meth)acrylate and hydroxystyrene.

The above monomers for the polymer (A) may be used alone or in combination depending upon required properties. The above monomers for the polymer (B) may be used alone or in combination depending upon required properties. Further, the monomer (b) for the polymer (A) and the monomer (b) for the polymer (B) are not necessarily required to be the same, or they may be the same or different.

The amount of the monomer (b) for the polymer (A) is 80 to 20% by weight. When the amount of the monomer (b) is smaller than 20% by weight, no sufficient hardness is obtained. Whentheaboveamount is greaterthan80% by weight, the water repellency is low.

The amount of the monomer (b) for the polymer (B) is 20 to 100% by weight. When the amount of the monomer (b) is smaller than 20% by weight, no sufficient hardness is obtained.

The monomer (c) having a carbon-carbon unsaturated double bond but having no crosslinkable functional group, other than the monomers (a) and (b), is used for imparting the water-repellent coating with properties such as hardness, toughness, scratch resistance and improved gloss. The monomer (c) includes (i) (meth)acrylic acid derivatives, (ii) aromatic vinyl monomers, (iii) olefinic hydrocarbon monomers, (iv) vinyl ester monomers, (v) vinyl halide monomers and (vi) vinyl ether monomers.

Examples of the (i) (meth)acrylic acid derivatives include (meth)acrylonitrile, (meth)acrylic acid salts, methyl (meth) acrylate, butyl (meth)acrylate, ethylhexyl (meth)acrylate, stearyl (meth)acrylate, benzyl (meth)acrylate, and alkyl (meth)acrylates in which some hydrogen atoms are replaced with fluorine atoms such as 2,2,3,3-tetrafluoropropyl (meth) acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate and 2,2,3,4,4,4-hexafluorobutyl (meth)acrylate.

Examples of the (ii) aromatic vinyl monomers include styrene, methylstyrene, ethylstyrene, chlorostyrene and styrenes in which hydrogen atom(s) is/are replaced with fluorine atom(s) such as monofluoromethylstyrene, difluoromethylsytyrene and trifluoromethylstyrene.

Examples of the (iii) olefinic hydrocarbon monomers include ethylene, propylene, butadiene, isobutylene, isoprene and 1,4-pentadiene.

Examples of the (iv) vinyl ester monomers include vinyl acetate.

Examples of the (v) vinyl halide monomers include vinyl chloride, vinylidene chloride, monofluoroethylene, difluoroethylene and trifluoroethylene.

Examples of the (vi) vinyl ether monomers include vinyl methyl ether.

The above monomers (c) for the polymer (A) may be used alone or in combination. The above monomers (c) for the polymer (B) may be used alone or in combination.

The amount of the monomer (c) for the polymer (A) is 0 to 30% by weight. When the amount of the monomer (c) exceeds 30% by weight, the water repellency decreases. The amount of the monomer (c) for the polymer (B) is 0 to 80% by weight. When the amount of the monomer (c) exceeds 80% by weight, no sufficient adhesion of the water-repellent coating to a substrate is obtained. Further, the polymer (B) is poor in compatibility with the polymer (A), and no uniform or good coating is obtained.

The polymer (A) and the polymer (B) can be obtained by a known polymerization method. For example, these polymers can be obtained by a solution polymerization method. The solvent for the polymerization method can be selected from alcohols such as methanol, ethanol, propanol, butanol, ethylene glycol methyl ether and diethylene glycol methyl ether; ketones such as acetone, methyl ethyl ketone, methyl isobutyl ketone and cyclohexanone; ethers such as tetrahydrofuran, dioxane, ethylene glycol dimethyl ether and diethylene glycol dimethyl ether; hydrocarbons such as hexane, heptane and octane; aromatic hydrocarbons such as benzene, toluene, xylene and cumene and esters such as ethyl acetate and butyl acetate. The above solvents may be used alone or in combination. When the polymer (A) or the polymer (B) is synthesized, the amount of the monomers is preferably 1 to 80% by weight.

The polymerization initiator used for the above polymerization can be selected from peroxides and azo compounds such as benzoyl peroxide, azoisobutylvareronitrile, azobisisobutylonitrle, di-tert-butyl peroxide, tert-butyl perbenzoate, tert-butyl peroctoate and cumenehydroxy peroxide. The temperature for the polymerization is 50 to 140° C., preferably 70 to 140° C.

Each of the synthesized polymer (A) and the synthesized polymer (B) preferably has a weight average molecular weight of 2,000 to 100,000.

In the present invention, further, a crosslinking agent may be used as required for crosslinking the crosslinkable functional group of the composition.

Typical examples of the crosslinking agent include melamine compounds having an alkylol or alkoxy group such as hexamethylolated melamine, hexamethoxymethylated melamine and hexabutoxymethylated melamine, cyanuric acid, ammelide, melamine, benzoguanamine, diethanolamine, triethanolamine, diaminopyridine, amino resins such as a benzoguanamine resin, methanol-modified melamine resin and urea resin, hydrazine, hydrazine compounds such as ADH, linear diamines such as ethylene diamine, propanediamine, butanediamine, pentanediamine, hexanediamine, diaminooctane, diaminodecane, diaminododecane, 2,5-dimethyl-2,5-hexamethylenediamine, polyoxypropylenediamine, diethylenetriamine, triethylenetetramine and tetraethylenepentamine, cyclic diamines such as menthenediamine, isophoronediamine, bis(4-amino-3-methyldicyclohexyl)methane, diaminodicyclohexylmethane, 3,9-bis(3-aminopropyl)-2,4,8,10-tetraoxaspyro[5,5]undecane, 1,4-bis(2-amino-2-methylpropyl)piperazine, m-xylenediamine, polycyclohexylpolyamine, bis(aminomethyl)bicyclo[2.2.1]heptane and methylenebis(tetramethaneamine), polyamines such as 6-hexamethylenediamine, triethylenetetramine, tetraethylenepentamine and diethylenetriamine, diisocyanates such as tolylene diioscyanate, naphtylene-1,1-diisocyanate, o-tolylene diisocynate, diphenylmethane diisocyanate, trimethylhexamethylene diisocyanate, isophorone diisocyanate, 4,4'-diphenylmethane diisocyanate, hexamethylene diisocyanate, m-xylene diisocyanate, p-xylene diisocyanate, lysine diisocyanate, hydrogenated 4,4'-diphenylmethane diisocyanate and hydrogenated tolylene diisocyanate, polyhydric isocyanates such as adducts of any one of these with one of glycols or diamines in which both terminals of the adduct are formed of isocyanates, triphenylmethane triisocyanate, polymethylene polyphenyl isocyanate and Coronate L, dicarboxylic acids such as oxalic acid, malonic acid, succinic acid, glutaric acid, hexanoic diacid, citric acid, maleic acid, methyl Nadic acid, dodecenyl succinic acid, sebacic acid, pyromellitic acid, hexahydrophthalic acid and tetrahydrophthalic acid, acid anhydrides of these, dialdehydes such as glyoxal and terephthalaldehyde, amino acids such as glycine and alanine, lactams thereof, hydroxycarboxylic acids such as citric acid, 12-hydroxystearic acid and 6-hydroxypentanoic acid, lactones thereof, diols such as 1,4-butanediol and 2,3-butanediol, polyhydric alcohols or polyhydric phenolic compounds such as 1,1,1-trimethylolpropane ethylene glycol, diethylene glycol, glycerin, erythritol, arabitol, xylitol, sorbitol, dulcitol, mannitol, catechol, resorcin, hydroquinone, guaiacol, hexylresorcin, pyrogallol, trihydroxybenzene, or alkoxy-modified compounds of these, bisepoxy compounds such as ethylene glycol diglycidyl ether, propylene glycol diglycidyl ether, polyethylene glycol diglycidyl ether, polypropylene glycol diglycidyl ether, tripropylene glycol diglycidyl ether, neopentyl glycol diglycidyl ether, 1,6-hexanediol diglycidyl ether and phthalic acid diglycidyl ester, epoxy resins such as Epikote 801, 802, 807, 815, 827, 818, 834, 815X, 815XA1, 828EL, 828XA, 1001, 1002, 1003, 1055, 1004, 1004AF, 1007, 1009, 1010, 1003F, 1004F, 1005F, 1100L, 834X90, 1001B80, 1001X70, 10001X75, 1001T75, 5045B80, 5046B80, 5048B70, 5049B70, 5050T60, 5050, 5051, 152, 154, 180S65, 180H65, 1031S, 1032H60, 604 and 157S70 (trade names, supplied by Yuka-Shell Epoxy Kabushiki Kaisha), phosphorus compounds such as ethyl phosphite, bisphenol A-modified polyphosphoric acid and triphenyl phosphite, and phosphoric acid dichloride compounds.

When the monomer (b) having a carbon-carbon unsaturated double bond and a carboxyl group is used, it is preferred to select a phenolic resin, an amino resin, diamine, polyamine, diisocyanate, a bisepoxy compound or an epoxy resin out of the above compounds, etc.

When the monomer (b) having a carbon-carbon unsaturated double bond and an isocyano group is used, it is preferred to select a hydrazine compound, a diamine, dicarboxylic acid, a dicarboxylic acid anhydride, a diol, a polyhydric alcohol, a polyhydric phenolic compound, a bisepoxy compound or an epoxy compound.

When the monomer (b) having a carbon-carbon unsaturated double bond and an epoxy group is used, it is preferred to select a dicarboxylic acid, a dicarboxylic acid anhydride, a polyhydric alcohol, a polyhydric phenolic compound, an alkoxy-modified product of a polyhydric alcohol or a polyhydric phenolic compound, an amino resin, diisocyanate, polyhydric isocyanate, amino acid, lactam of amino acid, a hydroxycarboxylic acid, lactone of a hydroxycarboxylic acid, a diamine or a polyamine.

When the monomer (b) having a carbon-carbon unsaturated double bond and an N-methylol or N-alkoxymethyl group is used, it is preferred to select a dicarboxylic acid, a melamine compound having an alkylol group or an alkoxy group, or an amino resin compound.

When the monomer (b) having a carbon-carbon unsaturated double bond and a hydroxyl group is used, it is preferred to select an amino resin, a diamine, a polyamine, diisocyanate, dialdehyde, an bisepoxy compound, an epoxy resin, a phosphorus compound or a phosphoric acid dichloride compound.

The above crosslinking agents may be used alone or in combination. The amount of the crosslinking agent (or the total amount of the crosslinking agents when two or more crosslinking agents are used), per 100% by weight of the resin composition, is 1 to 500% by weight, preferably 10 to 200% by weight.

In the present invention, for promoting the crosslinking reaction of the crosslinkable functional group of the composition or the crosslinking reaction between the crosslinkable functional group and the crosslinking agent, a crosslinking catalyst may be used depending upon the functional group. Typical examples of the crosslinking catalyst metal complex compounds such as aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraacetyl acetonate, metal alkoxides such as aluminum ethoxide, aluminum propoxide, aluminum butoxide, titanium ethoxide, titanium propoxide and titanium butoxide, metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate), acidic compounds such as formic acid, acetic acid, propionic acid, p-toluenesulfonic acid, trichloroacetic acid, phosphoric acid, monoalkylphosphoric acid, dialkylphosphoric acid, phosphate ester of β-hydroxyethyl (meth) acrylate, monoalkylphosphorous acid and dialkylphosphorous acid, acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride, organometal compounds such as diethyl zinc and tetra(n-butoxy)titanium, and amines such as dicyclohexylamine, triethylamine, N,N-dimethylbenzylamine, N,N,N',N'-tetramethyl-1,3-butanediamine, diethanolamine, triethanolamine and cyclohexylethylamine.

When the monomer (b) having a carbon-carbon unsaturated double bond and a hydrolyzable silyl group is used, it is preferred to select a metal complex compound, a metal alkoxide, a metal salt compound or an acidic compound out of the above crosslinking catalysts. It is particularly preferred to select a tin compound such as dibutyltin diacetate, dibutyltin dioctoate, dibutyltin dilaurate or dibutyltin dimaleate or p-toluenesulfonic acid.

When the monomer (b) having a carbon-carbon unsaturated double bond and a carboxyl group is used, it is preferred to select an acid, ammonium salt of an acid, a lower amine salt of an acid, or a polyvalent metal salt of an acid.

When the monomer (b) having a carbon-carbon unsaturated double bond and an isocyano group is used, it is preferred to select an amine or a metal salt compound.

When the monomer (b) having a carbon-carbon unsaturated double bond and an epoxy group is used, it is preferred to select an organometal compound or an amine.

When the monomer (b) having a carbon-carbon unsaturated double bond and an N-methylol or N-alkoxymethyl group is used, it is preferred to select an acid, ammonium salt of an acid, a lower amine salt of an acid, or a polyvalent metal salt of an acid.

When the monomer (b) having a carbon-carbon unsaturated double bond and a hydroxyl group is used, it is preferred to select an acidic compound, an acid, ammonium salt of an acid, lower amine salt of an acid, or a polyvalent metal salt of an acid.

The above crosslinking catalysts may be used alone or in combination. The amount of the crosslinking catalyst (or the total amount of the crosslinking catalysts when two or more catalysts areused), per 100% byweight of theresincomposition, is 0.01 to 10% by weight, preferably 0.1 to 5% by weight.

In the present invention, further, a silane coupling agent may be used as required. Specific examples of the silane coupling agent include tetrafunctional silanes such as tetramethoxysilane and tetraethoxysilane, trifunctional silanes such as methyltrimethoxys ilane, methyltriethoxysilane, γ-chloropropyltrimethoxysilane, vinyltrimethoxysilane, γ-methacryloyloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltrimethoxysilane and γ-morpholinopropyltrimethoxysilane, and difunctional silanes in which part of the above trifunctional silanes is replaced with alkyl, phenyl or vinyl group, such as dimethyldimethoxysilane, phenylmethyldimethoxysilane, vinylmethyldimethoxysilane, γ-chloropropylmethyldimethoxysilane and γ-glycidoxypropylmethyldimethoxysilane. Further, the silane coupling agent may be also selected from hydrolyzates and partical condensation products of the above compounds. The amount of the silane coupling agent based on the total amount of the polymers (A) and (B) is 1 to 40% by weight, preferably 3 to 20% by weight.

In the present invention, further, an organosilica sol may be used for improving a coating in water repellency. The organosilica sol refers to a colloid solution prepared by stably dispersing colloidal silica in an organic solvent. Typical examples of the organosilica sol include IPA-ST, MIBK-ST, MA-ST-M, EG-ST, EG-ST-ZL, NPC-ST, DMAC-ST, DMAC-ST-ZL, XBA-ST (all trade names, supplied by Nissan Chemical Industry Co., Ltd.), and methanol silica sol. The amount of the organosilica sol based on the total amount of the polymers (A) and (B) is 10 to 80% by weight, preferably 20 to 60% by weight. When the amount of the organosilica sol is less than the above lower limit, there is little effect on the improvement of the water repellency. When the above amount exceeds the above upper limit, undesirably, the adhesion to a substrate is impaired.

The resin composition of the present invention invention may contain various additives such as a filler, a thixotropic agent, a coloring pigment, an extender pigment, a dye, an aging preventer, an antioxidant, an antistatic agent, a flame retardant, a thermal conductivity improver, a plasticizer, an anti-sagging agent, a stainproofing agent, an antiseptic agent, a bactericide, an antifoaming agent, a leveling agent and a curing agent so long as these additives may not cause an adverse effect on the effect of the present invention.

The water-repellent coating composition of the present invention is obtained by mixing and dissolving the polymer (A), the polymer (B) and optionally the other components such as the above silane coupling agent, the above catalyst and the above additive with/in a solvent. The solvent is selected from alcohols such as methanol, ethanol propanol, butanol, ethylene glycol methyl ether and diethylene glycol methyl ether, ketones such as acetone, methyl ethyl ketone, methyl isobutyl ketone and cylohexanone, ethers such as tetrahydrofuran, dioxane, ethylene glycol dimethyl ether and diethylene glycol dimethyl ether, hydrocarbons such as hexane, heptane and octane, aromatic hydrocarbons such as benzene, toluene, xylene and cumene, and esters such as ethyl acetate and butyl acetate, depending upon the resin composition. The above solvents may be used alone or in combination. A halogen-free solvent is preferably used.

The method of the above mixing is not specially limited. Generally, polymer solutions from the polymerization are mixed, and the mixture is stirred with a stirring blade, a vibration stirrer or a rotary stirrer. For improving the coating properties of the coating composition, a solvent may be added, or the above mixture may be concentrated. Further, preferably, the polymer (A) and the polymer (B) are mixed in such amounts that the amount of the fluorine-containing monomer (a) is 0.1 to 10% by weight based on the total amount of the polymers (A) and (B). When the amount of the fluorine-containing monomer is smaller than 0.1% by weight, no sufficient water repellency is obtained. When the above amount is larger than 10% by weight, no sufficient coating hardness is obtained, and the cost of the coating composition increases.

The above water-repellent coating composition is applied to a substrate which is required to have water repellency, oil repellency, stainproofing, weathering resistance and the like, and the composition gives a water-repellent coating excellent in coherence, hardness, acid resistance, etc. The application method is not specially limited, and any one of a dipping method, a spraying method and a brushing method may be used. The applied water-repellent coating composition gives a tough water-repellent coating by air-drying it or by heating it at 30 to 220° C. for several seconds to several weeks.

The water-repellent coating composition can be applied to glass products such as a windshield glass, rear window glass, side window glass, a fender mirror and wing mirrors of an automobile, window glass of a train and airplane, window glass of buildings, window glass of general houses, glass bottles for keeping enzymes, etc., ampoules, glass bottles for reagents, other general glass bottles, mirrors, and the like. Further, the water-repellent coating composition can be applied to plastic products, various films, metal products, concrete, ceramic products, cloth, leather products, etc., which are required to have water repellency in the field of medicine, foods, agriculture and other industries or for usual house keeping, such as water-repellent glass, an anti-fogging mirror, a glass bottle free of adherence of an enzyme or a reagent, an antibacterial and anti-mold plastic, an inkjet printer head, a coated plate for preventing the adherence of snow and ice, a stain-less aluminum sheet used in kitchen, a water-free offset printing plate, etc.

EXAMPLES

The present invention will be specifically explained with reference to Examples hereinafter, in which "part" stands for "part by weight" and "%" stands for "%" by weight. Further, syntheses in Examples were all carried out in nitrogen-containing atmosphere.

Examples 1–14

Two four-necked flasks each of which had a cooling tube, a stirrer, a thermometer and a nitrogen introducing tube were used. Components A for polymer A shown in Table 1 were charged into one of the above flasks, and 200 parts of ethyl acetate as a solvent was added. The components were temperature-increased up to 80° C. with stirring, and 1.6 parts of azobisisobutyronitrile was added, thereby to carry out polymerization for 2 hours. Further, 0.4 part of azobisisobutyronitrile was added, to continue the polymerization for 2 hours, whereby a polymer A solution was obtained. Separately, components B for polymer B shown in Table 1 were also charged into the other flask, and 200 parts of ethyl acetate as a solvent was added. Thereafter, the same procedures as those for the components A were repeated to obtain a polymer B solution.

The polymer A solution from the components A and the polymer B solution from the components B were mixed in a solid weight ratio of 1:99 (polymer A:polymer B). Comparative Example 1 used a single polymer having the same composition as that of the mixture of the two polymers (polymer A:polymer B=1:99) in Example 1. Comparative Example 3 used a mixture prepared by mixing $F(CF_2)_8C_2H_4Si(OCH_3)_3$ with a polymer B from components B in a mixing ratio of 10:90.

Each of the mixtures was independently mixed with a crosslinking agent and/or a crosslinking catalyst shown in Table 2 in amount(s) shown in Table 2 (based on the solid content of the solution), and ethyl acetate was added to obtain coating solutions having a solid content of 10%. Each of the coating solutions was independently applied to a glass plate having a thickness of about 1.3 mm with a 1 mil applicator and allowed to stand at room temperature for 30 minutes. Thereafter, the coatings other than that in Comparative Example 3 were placed in an oven at 200° C. for 10 minutes to obtain glass plates each of which was provided with a water-repellent coating. The coating in the Comparative Example was not baked.

Comparative Example 4

The water-repellent glass obtained in Comparative Example 3 was baked in an oven at 200° C. for 10 minutes.

TABLE 1

| | Ex. 1 | Ex. 2 | Ex. 3 | Ex. 4 | Ex. 5 | Ex. 6 |
|---|---|---|---|---|---|---|
| COMPONENT A | | | | | | |
| $CH_2=C(CH_3)COOC_2H_4(CF_2)_8F$ | 55 | 55 | | | 45 | 45 |
| $CH_2=C(CH_3)COOC_2H_4(CF_2)_6F$ | | | 55 | | | |
| $CH_2=C(CH_3)COOC_2H_4(CF_2)_2F$ | | | | 55 | | |
| $CH_2=C(CH_3)COOC_3H_6Si(OCH_3)_3$ | 45 | 40 | 40 | 40 | 40 | 40 |
| $CH_2=CHCOOH$ | | 5 | 5 | 5 | 5 | 5 |
| Methacryloyloxyethyl isocyanate | | | | | | |
| Glycidyl methacrylate | | | | | | |
| N,N-di(methoxymethyl)-methacrylamide | | | | | | |
| 2-hydroxyethyl methacrylate | | | | | | |
| $CH_2=C(CH_3)COOCH_3$ | | | | | 10 | 10 |
| COMPONENT B | | | | | | |
| $CH_2=C(CH_3)COOC_3H_6Si(OCH_3)_3$ | 100 | 75 | 75 | 75 | 75 | 70 |
| $CH_2=C(CH_3)COOH$ | | | | | | |
| $CH_2=CHCOOH$ | | 25 | 25 | 25 | 25 | 20 |
| Methacryloyloxyethyl isocyanate | | | | | | |
| Glycidyl methacrylate | | | | | | |
| N,N-di(methoxymethyl)-methacrylamide | | | | | | |
| 2-hydroxyethyl methacrylate | | | | | | |
| $CH_2=C(CH_3)COOCH_3$ | | | | | | 10 |

| | Ex. 7 | Ex. 8 | Ex. 9 | Ex. 10 | Ex. 11 | Ex. 12 |
|---|---|---|---|---|---|---|
| COMPONENT A | | | | | | |
| $CH_2=C(CH_3)COOC_2H_4(CF_2)_8F$ | 45 | 45 | 50 | 50 | 45 | 45 |
| $CH_2=C(CH_3)COOC_2H_4(CF_2)_6F$ | | | | | | |
| $CH_2=C(CH_3)COOC_2H_4(CF_2)_2F$ | | | | | | |
| $CH_2=C(CH_3)COOC_3H_6Si(OCH_3)_3$ | 40 | 40 | 30 | | | |
| $CH_2=CHCOOH$ | 15 | 5 | | 30 | | |
| Methacryloyloxyethyl isocyanate | | | | | 30 | |
| Glycidyl methacrylate | | | | | | 30 |
| N,N-di(methoxymethyl)-methacrylamide | | | | | | |
| 2-hydroxyethyl methacrylate | | | | | | |
| $CH_2=C(CH_3)COOCH_3$ | | 10 | 20 | 20 | 25 | 25 |
| COMPONENT B | | | | | | |
| $CH_2=C(CH_3)COOC_3H_6Si(OCH_3)_3$ | 70 | 70 | 70 | | | |
| $CH_2=C(CH_3)COOH$ | | 20 | | | | |
| $CH_2=CHCOOH$ | 10 | | | 50 | | |
| Methacryloyloxyethyl isocyanate | | | | | 30 | |
| Glycidyl methacrylate | | | | | | 50 |
| N,N-di(methoxymethyl)-methacrylamide | | | | | | |
| 2-hydroxyethyl methacrylate | | | | | | |
| $CH_2=C(CH_3)COOCH_3$ | 20 | 10 | 30 | 50 | 70 | 50 |

| | Ex. 13 | Ex. 14 | CEx. 1 | CEx. 2 | CEx. 3 |
|---|---|---|---|---|---|
| COMPONENT A | | | | | |
| $CH_2=C(CH_3)COOC_2H_4(CF_2)_8F$ | 45 | 40 | 0.55 | 55 | |
| $CH_2=C(CH_3)COOC_2H_4(CF_2)_6F$ | | | | | |
| $CH_2=C(CH_3)COOC_2H_4(CF_2)_2F$ | | | | | |
| $CH_2=C(CH_3)COOC_3H_6Si(OCH_3)_3$ | | | 97.4 | 40 | |
| $CH_2=CHCOOH$ | | | 2.05 | 5 | |
| Methacryloyloxyethyl isocyanate | | | | | |
| Glycidyl methacrylate | | | | | |
| N,N-di(methoxymethyl)-methacrylamide | 30 | | | | |
| 2-hydroxyethyl methacrylate | | 30 | | | |
| $CH_2=C(CH_3)COOCH_3$ | 25 | 25 | | | |
| COMPONENT B | | | | | |
| $CH_2=C(CH_3)COOC_3H_6Si(OCH_3)_3$ | | | | 10 | 75 |
| $CH_2=C(CH_3)COOH$ | | | | | |
| $CH_2=CHCOOH$ | | | | | 15 |

TABLE 1-continued

| | | | |
|---|---|---|---|
| Methacryloyloxyethyl isocyanate | | | |
| Glycidyl methacrylate | | | |
| N,N-di(methoxymethyl)-methacrylamide | 30 | | |
| 2-hydroxyethyl methacrylate | | 50 | |
| $CH_2=C(CH_3)COOCH_3$ | 70 | 50 | 10 |

TABLE 2

| Sample | Crosslinking agent, Crosslinking catalyst | Amount (based on solid content) |
|---|---|---|
| Example 1 | Crosslinking catalyst: p-toluenesulfonic acid | 1% |
| Example 2 | Crosslinking catalyst: p-toluenesulfonic acid | 1% |
| Example 3 | Crosslinking catalyst: p-toluenesulfonic acid | 1% |
| Example 4 | Crosslinking catalyst: p-toluenesulfonic acid | 1% |
| Example 5 | Crosslinking catalyst: p-toluenesulfonic acid | 1% |
| Example 6 | Crosslinking catalyst: p-toluenesulfonic acid | 1% |
| Example 7 | Crosslinking catalyst: p-toluenesulfonic acid | 1% |
| Example 8 | Crosslinking catalyst: p-toluenesulfonic acid | 1% |
| Example 9 | Crosslinking catalyst: p-toluenesulfonic acid | 1% |
| Example 10 | Crosslinking catalyst: tin octylate | 1% |
| | Crosslinking agent; Epikote 828 | 60% |
| Example 11 | Crosslinking catalyst: tin octylate | 1% |
| | Crosslinking agent; hexamethylene glycol | 19% |
| Example 12 | Crosslinking catalyst: tin octylate | 1% |
| | Crosslinking agent; adipic acid | 25% |
| Example 13 | Crosslinking catalyst: tin octylate | 1% |
| Example 14 | Crosslinking catalyst: tin octylate | 1% |
| | Crosslinking agent; ethylenediamine | 30% |
| Comparative Example 1 | Crosslinking catalyst: p-toluenesulfonic acid | 1% |
| Comparative Example 2 | Crosslinking catalyst: p-toluenesulfonic acid | 1% |
| Comparative Example 3 | Crosslinking catalyst: p-toluenesulfonic acid | 1% |
| Comparative Example 4 | Crosslinking catalyst: p-toluenesulfonic acid | 1% |

The above-obtained glass plates provided with water-repellent coatings were tested as follows.

Contact angle: A water-repellent coating was measured for a contact angle to pure water with a contact angle meter.

Weathering resistance: A glass plate provided with a water-repellent coating was allowed to stand in a sunshine fadeometer (Sunshine super long carbon, arc lamp light source, discharge voltage and current 50 V—60 A., 30° C., about 50% RH) for 300 hours, and then the water-repellent coating was measured for a contact angle to pure water with a contact angle meter.

Acid resistance: A glass plate provided with a water-repellent coating was immersed in a 5% sulfuric acid aqueous solution at room temperature for 4 hours, and the coating was visually evaluated.

Pencil hardness: Measured according to the method of JIS K5400 at room temperature.

TABLE 3

| Sample | Contact angle After coating was formed | Contact angle After 300 hours | Acid resistance | Pencil hardness |
|---|---|---|---|---|
| Example 1 | 112 | 107 | Excellent | 9H |
| Example 2 | 111 | 105 | Excellent | 9H |
| Example 3 | 108 | 105 | Excellent | 9H |
| Example 4 | 109 | 102 | Excellent | 9H |
| Example 5 | 102 | 100 | Excellent | 9H |
| Example 6 | 112 | 110 | Excellent | 8H |
| Example 7 | 110 | 103 | Excellent | 9H |
| Example 8 | 109 | 107 | Excellent | 9H |
| Example 9 | 107 | 102 | Excellent | 8H |
| Example 10 | 103 | 101 | Excellent | 8H |
| Example 11 | 105 | 101 | Excellent | 3H |
| Example 12 | 112 | 106 | Excellent | 3H |
| Example 13 | 110 | 106 | Excellent | 2H |
| Example 14 | 109 | 107 | Excellent | 3H |
| Comparative Example 1 | 68 | 67 | Excellent | 8H |
| Comparative Example 2 | 111 | 103 | Excellent | 4H |
| Comparative Example 3 | 108 | 73 | Poor | 7H |
| Comparative Example 4 | 80 | 75 | Poor | 7H |

As explained above, the present invention uses a mixture of a polymer having a crosslinkable functional group and a perfluoroalkyl group in side chain and a polymer having a crosslinkable functional group. As a result, the water-repellent coating provided by the present invention has high water repellency, excellent adherence to a substrate and a high crosslinking density (or high hardness) and excellent acid resistance (resistance to acid rain) in spite of its low fluorine content. Further, the water-repellent resin composition is inexpensive due to a low fluorine content. In particular, when a monomer having a hydrolyzable silyl group is used, a hard coating is obtained.

What is claimed is:

1. A water-repellent coating composition, which contains:
   (1) a polymer (A) formed from 20 to 80% by weight of a fluorine-containing monomer (a) having a carbon-carbon unsaturated double bond and a perfluoroalkyl group, 20 to 80% by weight of a non-fluorine containing monomer (b) having a carbon-carbon unsaturated double bond and a crosslinkable functional group and 0 to 30% by weight of a monomer (c) having a carbon-carbon unsaturated double bond other than the monomers (a) and (b), which polymer (A) is obtained by solution polymerization in the presence of a halogen-free solvent, and a polymer (B) formed from 20 to 100% by weight of a non-fluorine containing monomer (b) having a carbon-carbon unsaturated double bond and a crosslinkable functional group and 0 to 80% by weight of a monomer (c) having a carbon-carbon unsaturated double bond other than the monomer (a) and (b), and wherein the fluorine-containing monomer (a) is used for synthesizing the polymer (A) in such an amount that the amount of the fluorine-containing monomer (a) is 0.1 to 10% by weight based on the total amount of the polymer (A) and the polymer (B), and
   (2) a halogen-free solvent.

2. A composition according to claim 1, wherein the crosslinkable functional group of the monomer (b) is a hydrolyzable silyl group.

3. A composition according to claim 1, wherein the crosslinkable functional group of the monomer (b) is at least one member selected from the group consisting of a carboxyl group, an isocyano group, an epoxy group, an N-methylol or N-alkoxymethyl group, and a hydroxyl group.

4. A composition according to claim 1, wherein the monomer (c) is at least one monomer having no functional group, selected from the group consisting of (meth)acrylic acid derivatives, aromatic vinyl monomers, olefinic hydrocarbons, vinyl halide monomers and vinyl ether monomers.

5. A composition according to claim 1, wherein the composition further contains, as a crosslinking agent, a compound reactive with the crosslinkable functional groups of the polymer (A) and the polymer (B).

6. A composition according to claim 1, wherein the composition further contains, as a crosslinking catalyst, a compound which promotes a crosslinking reaction of the crosslinkable functional groups of the polymer (A) and the polymer (B).

7. A composition according to claim 5, wherein the composition further contains, as a crosslinking catalyst, a compound which promotes a crosslinking reaction of the crosslinkable functional groups of the polymer (A) and the polymer (B) with the crosslinking agent.

8. A composition according to claim 1, wherein the composition further contains a silane coupling agent.

9. A composition according to claim 1, wherein the composition further contains an organosilica sol.

10. A coating composition according to claim 1, wherein the coating composition contains a silane coupling agent in an amount of 1 to 40% by weight based on the total weight of the polymer (A) and the polymer (B).

11. The water-repellant coating composition according to claim 1, wherein the solution polymerization for the preparation of polymer (A) is performed in a solvent which consists essentially of said halogen-free solvent.

* * * * *

UNITED STATES PATENT AND TRADEMARK OFFICE
CERTIFICATE OF CORRECTION

PATENT NO. : 5,945,482
DATED : August 31, 1999
INVENTOR(S) : Yoshihisa FUKUCHI et al.

It is certified that error appears in the above-identified patent and that said Letters Patent is hereby corrected as shown below:

Column 14,

Claim 10, line 1, delete "coating".

Signed and Sealed this

Twenty-sixth Day of September, 2000

Attest:

Q. TODD DICKINSON

*Attesting Officer*        *Director of Patents and Trademarks*